(12) United States Patent
Beardsley et al.

(10) Patent No.: US 6,704,837 B2
(45) Date of Patent: *Mar. 9, 2004

(54) METHOD AND APPARATUS FOR INCREASING RAID WRITE PERFORMANCE BY MAINTAINING A FULL TRACK WRITE COUNTER

(75) Inventors: Brent Cameron Beardsley, Tucson, AZ (US); Thomas Charles Jarvis, Tucson, AZ (US); David Frank Mannenbach, Tucson, AZ (US); Robert Louis Morton, Tucson, AZ (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 93 days.

(21) Appl. No.: 09/106,614

(22) Filed: Jun. 29, 1998

(65) Prior Publication Data

US 2002/0035666 A1 Mar. 21, 2002

(51) Int. Cl.$^7$ .............................................. G06F 12/00
(52) U.S. Cl. ............................................ 711/114; 714/6
(58) Field of Search ........................ 714/6, 7; 711/114, 711/135, 143, 155, 112, 113

(56) References Cited

U.S. PATENT DOCUMENTS

| | | | |
|---|---|---|---|
| 4,262,332 A | 4/1981 | Bass et al. | 364/200 |
| 4,584,617 A | 4/1986 | Libove et al. | 360/49 |
| 4,761,785 A | 8/1988 | Clark et al. | 371/51 |
| 4,875,155 A | 10/1989 | Iskiyan et al. | 364/200 |
| 5,235,692 A | 8/1993 | Ayres et al. | 395/425 |
| 5,257,362 A | 10/1993 | Menon | 395/425 |
| 5,307,216 A | 4/1994 | Cook et al. | 360/72.1 |
| 5,408,644 A | 4/1995 | Schneider et al. | 395/575 |
| 5,446,861 A | 8/1995 | Idleman et al. | 395/427 |
| 5,506,977 A * | 4/1996 | Jones | 711/155 |
| 5,537,534 A * | 7/1996 | Voigt et al. | 714/6 |
| 5,550,998 A | 8/1996 | Willis et al. | 395/441 |
| 5,574,882 A | 11/1996 | Menon et al. | 395/441 |
| 5,600,816 A | 2/1997 | Oldfield et al. | 395/440 |
| 5,682,513 A | 10/1997 | Candelaria et al. | 395/440 |
| 5,778,426 A * | 7/1998 | DeKoning et al. | 711/122 |
| 5,860,090 A * | 1/1999 | Clark | 711/113 |
| 5,884,098 A * | 3/1999 | Mason, Jr. | 710/52 |
| 6,098,153 A * | 8/2000 | Fuld et al. | 711/134 |
| 6,112,277 A * | 8/2000 | Bui et al. | 711/114 |

FOREIGN PATENT DOCUMENTS

JP  7-248884  9/1995

OTHER PUBLICATIONS

"Improving Airline Subsystem Performance By Overlapping Semi–Synchronous Process", *IBM Technical Disclosure Bulletin*, 34(5):345–347 (Oct. 1991).

* cited by examiner

*Primary Examiner*—Gary Portka
(74) *Attorney, Agent, or Firm*—Crawford Maunu PLLC

(57) ABSTRACT

A method and apparatus for improving write performance in a disk array, wherein unnecessary track grouping is avoided during writes, by using a full track write counter. When a write request is received, the full track write counter for tracks in a stripe of tracks associated with the write request is analyzed to determine whether the write request involves a full track write. A cache destage is subsequently executed based on the analysis. When the write to cache is a full track write, a previous track full track count is fetched from a previous track's full write counter, a full track count of the tracks associated with the write request are set to be equal to the minimum of either the stripe width or the previous track's full track count plus one. When the full track write counter of the last track in the stripe is equal to the stripe width, each track in the stripe is processed for destage, new parity for the stripe is generated based on modifications to each track and new data resulting from the modifications and the new parity are written to a rank.

27 Claims, 9 Drawing Sheets

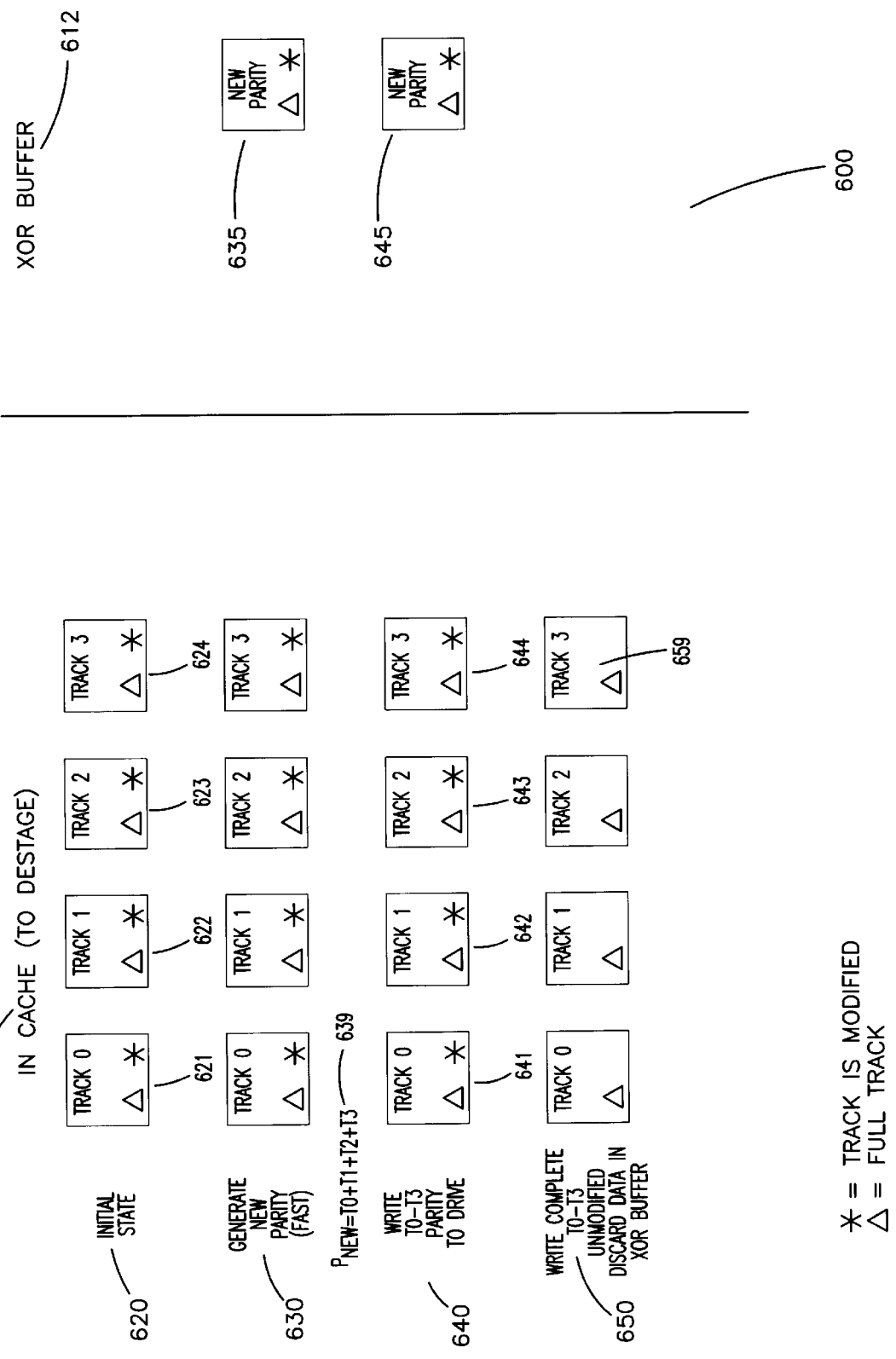

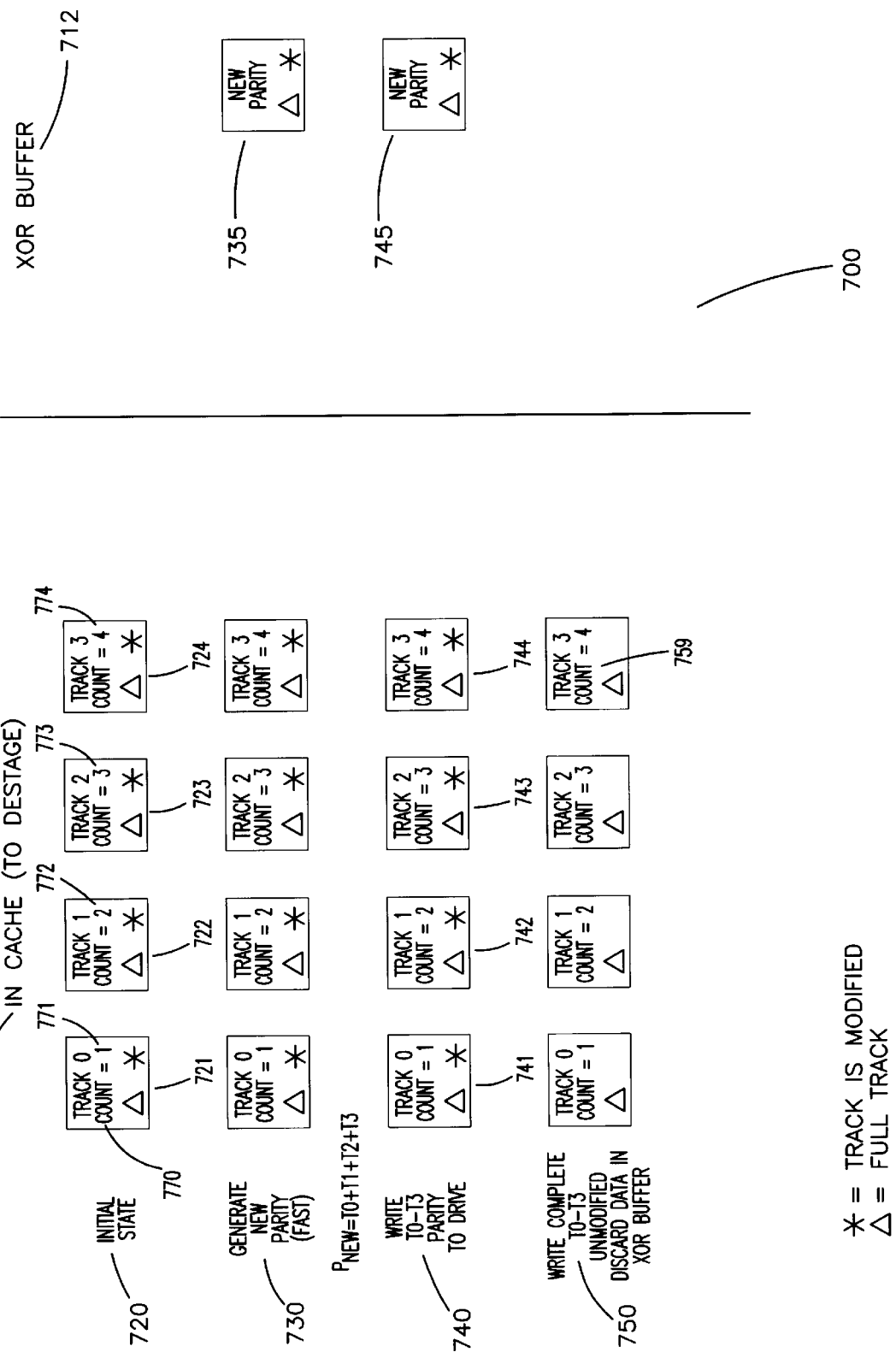

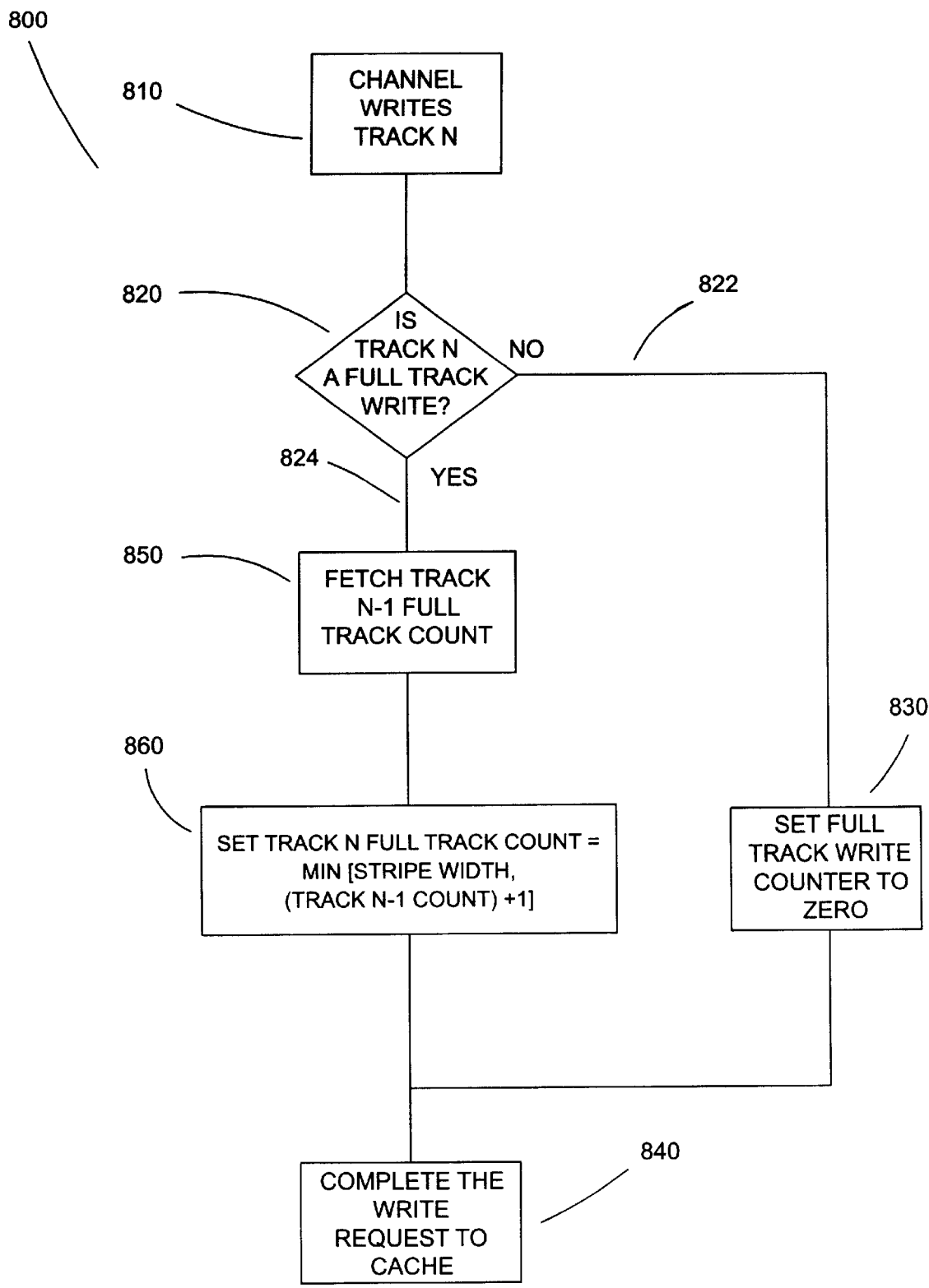

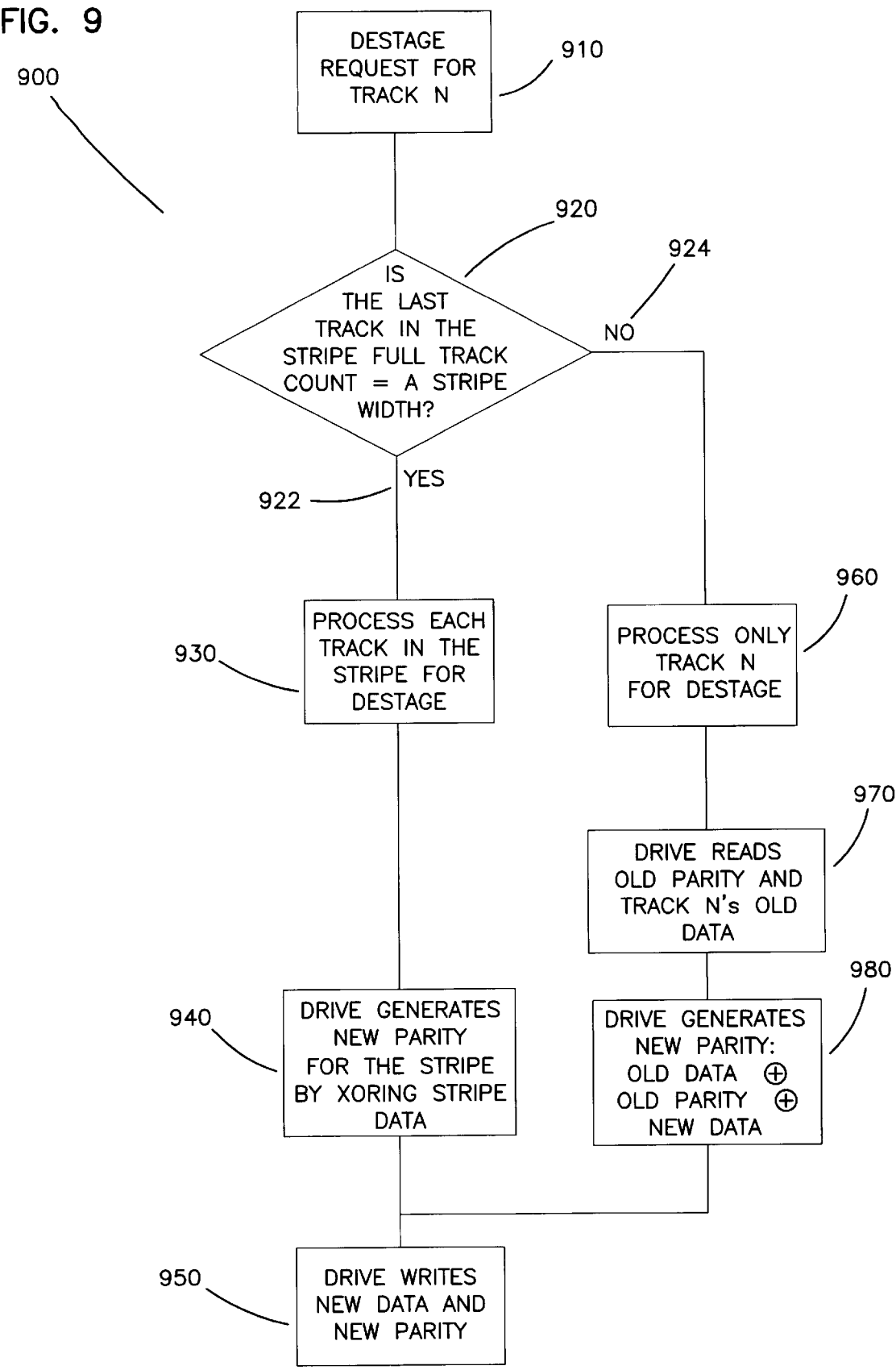

METHOD AND APPARATUS FOR INCREASING RAID WRITE PERFORMANCE BY MAINTAINING A FULL TRACK WRITE COUNTER

BACKGROUND OF THE INVENTION

1. Field of the Invention

This invention relates in general to data storage systems, and more particularly to a method and apparatus for increasing RAID (redundant array of independent disks) write performance by maintaining a full track write counter.

2. Description of Related Art

In recent years, there has been a growth in interest in disk arrays. Disk arrays consist of a number of disk drives connected to a host system via one or more controller elements which control the transfer of data between the host and disk drives. A disk array is designed to provide high capacity data storage, high reliability and high data transfer rates to and from the system.

RAID was conceived at the University California at Berkeley in 1987 as a means for improving storage subsystem reliability and performance. The concept initially consisted of clustering small inexpensive disk drives into an array such that the array could appear to the system as a single large expensive drive (SLED). The result of this initial testing found that the array of drives could actually deliver the same or better performance than the traditional individual hard drive. However, there was a problem with this implementation. The resulting Mean Time Before Failure (MTBF) of the array was actually reduced due to the probability of any one drive of the array failing. As a result of this finding, the Berkeley scientists proposed five levels or methods of RAID to provide a balance of performance and data protection. RAID subsystems can be optimized for performance, the highest capacity, fault tolerance or a combination of two or three of the above. Different so-called RAID levels have been defined and standardized in accordance with those general optimization parameters. There are six standardized RAID levels, called RAID 0, 1, 2, 3, 4 or 5.

A RAID controller board is the hardware element that serves as the backbone for the array of disks. It not only relays the input/output (I/O) commands to specific drives in the array, but provides the physical link to each of the independent drives so they may easily be removed or replaced. The controller also serves to monitor the integrity of each drive in the array to anticipate the need to move data should it be placed in jeopardy by faulty or failing disk drive (a feature known as "fault tolerance"). RAID utilizes some form of parity information to maintain data integrity across all drives in the subsystem. A rank is the set of logical volumes related to each other for parity protection, i.e., the number or set of drives covered by a parity scheme.

RAID Level 0 is achieved through a method known as striping and is optimized for performance at the expense of fault tolerance. Disk striping is a technique for spreading data over multiple disk drives. Disk striping can speed up operations that retrieve data from disk storage. The computer system breaks a body of data unto units and spreads these units across the available disks. Systems that implement disk striping generally allow the user to select the data unit size or stripe width.

The collection of drives in a RAID Level 0 array has data laid down in such a way that it is organized in stripes across the multiple drives. A typical array can contain any number of stripes, usually in multiples of the number of drives present in the array.

The reason RAID 0 is a performance-enhancing configuration is that striping enables the array to access data from multiple drives at the same time. In other words, since the data is spread out across a number of drives in the array, it can be accessed faster because it's not bottled up on a single drive. This is especially beneficial for retrieving very large files, since they can be spread out effectively across multiple drives and accessed as if it were the size of any of the fragments it is organized into on the data stripes.

The downside to RAID Level 0 configurations is that it sacrifices fault tolerance, raising the risk of data loss because no room is made available to store redundant data. If one of the drives in the RAID 0 fails for any reason, there is no way of retrieving the lost data as can be done in other RAID implementations described below.

The RAID Level 1 is achieved through disk mirroring, and is done to ensure data reliability or a high degree of fault tolerance. RAID 1 also enhances read performance, but the improved performance and fault tolerance are at the expense of available capacity in the drives used.

In a RAID Level 1 configuration, the RAID management software instructs the subsystem's controller to store data redundantly across a number of the drives (mirrored set) in the array. In other words, the same data is copied and stored on different disks (or "mirrored") to ensure that, should a drive fail, the data is available somewhere else within the array. In fact, all but one of the drives in a mirrored set could fail and the data stored to the RAID 1 subsystem would remain intact. A RAID Level 1 configuration can consist of multiple mirrored sets, whereby each mirrored set can be a different capacity. Usually the drives making up a mirrored set are of the same capacity. If drives within a mirrored set are of different capacities, the capacity of a mirrored set within the RAID 1 subsystem is limited to the capacity of the smallest-capacity drive in the set.

The read performance gain can be realized if the redundant data is distributed evenly on all of the drives of a mirrored set within the subsystem. The number of read requests and total wait state times both drop significantly; inversely proportional to the number of hard drives in the RAID.

RAID Level 2 is rarely used in commercial applications, but is another means of ensuring data is protected in the event drives in the subsystem incur problems or otherwise fail. This level builds fault tolerance around Hamming error correction code (ECC), which is used as a means of maintaining data integrity. ECC tabulates the numerical values of data stored on specific blocks in the virtual drive using a special formula that yields what is known as a checksum. The checksum is then appended to the end of the data block for verification of data integrity when needed.

As data gets read back from the drive, ECC tabulations are again computed, and specific data block checksums are read and compared against the most recent tabulations. If the numbers match, the data is intact; if there is a discrepancy, the lost data can be recalculated using the first or earlier checksum as a reference point.

RAID level 3 is really an adaptation of RAID Level 0 that sacrifices some capacity, for the same number of drives, but achieves a high level of data integrity or fault tolerance. It takes advantage of RAID Level 0's data striping methods, except that data is striped across all but one of the drives in the array. This drive is used to store parity information that is used to maintain data integrity across all drives in the subsystem. The parity drive itself is divided up into stripes, and each parity drive stripe is used to store parity information for the corresponding data stripes dispersed throughout the array. This method achieves very high data transfer performance by reading from or writing to all of the drives in parallel or simultaneously but retains the means to reconstruct data if a given drive fails, maintaining data integrity for the system. RAID Level 3 is an excellent configuration for moving very large sequential files in a timely manner.

The stripes of parity information stored on the dedicated drive are calculated using an "Exclusive OR" function, which is a logical function between the two series that carries most of the same attributes as the conventional OR function. The difference occurs when the two bits in the function are both non-zero: in Exclusive OR, the result of the function is zero, wherein with conventional OR it would be one.

RAID Level 4 is similar in concept to RAID Level 3, but emphasizes performance for different applications. Another difference between the two is that RAID Level 4 has a larger stripe depth, usually of two blocks, which allows the RAID management software to operate the disks much more independently than RAID Level 3. This essentially replaces the high data throughput capability of RAID Level 3 with faster data access in read-intensive applications.

A shortcoming of RAID level 4 is rooted in an inherent bottleneck on the parity drive. As data gets written to the array, the parity encoding scheme tends to be more tedious in write activities than with other RAID topologies. This more or less relegates RAID Level 4 to read-intensive applications with little need for similar write performance. As a consequence, like its Level 3, it doesn't see much common use in commercial applications.

Finally, RAID Level 5 is the last of the most common RAID levels in use, and is probably the most frequently implemented. RAID Level 5 minimizes the write bottlenecks of RAID Level 4 by distributing parity stripes over a series of hard drives. In doing so it provides relief to the concentration of write activity on a single drive, which in turn enhances overall system performance.

The way RAID Level 5 reduces parity write bottlenecks is relatively simple. Instead of allowing any one drive in the array to assume the risk of a bottleneck, all of the drives in the array assume write activity responsibilities. The distribution frees up the concentration on a single drive, improving overall subsystem throughput.

RAID Level 5's parity encoding scheme is the same as Levels 3 and 4; it maintains the system's ability to recover any lost data should a single drive fail. This can happen as long as no parity stripe on an individual drive stores the information of a data stripe on the same drive. In other words, the parity information for any data stripe must always be located on a drive other than the one on which the data resides.

RAID strategies can be implemented using hardware or software solutions. In a hardware solution, the RAID controller interface handles the creation and regeneration of redundant information. Some vendors sell disk subsystems that implement RAID technology completely within the hardware. Some of these hardware implementations support hot-swapping of disks, which enables you to replace a failed disk while the computer is still running. A hardware implementation of RAID support can offer performance advantages over the software implementation included in Windows NT®.

Windows NT provides a software implementation for RAID using the Windows NT file system (NTFS) and the File Allocation Table (FAT) file system. Windows NT Server provides software support for two fault-tolerant disk configurations: mirror sets and stripe sets with parity. Windows NT Server and Windows NT Workstation have software support for stripe sets.

Still, computer system performance is determined by a combination of factors working in tandem to achieve the efficient results people have come to expect from even basic computer systems. In the early stages of the buying cycle, processor speeds typically get the most attention, but they are actually only one consideration in overall system performance. In addition to determining processor speed and hard drive size requirements, understanding the complexities of RAM (random access memory) is critical. RAM is the component that handles the executable tasks of any application. When an application is recalled from the hard drive, the program is put into the RAM and is ready to be used. The amount of RAM in a system has a large effect on the speed in which it will run an application. The more RAM available, the less the processor has to access the hard drive, because more instructions can be carried out by the main memory instead of temporarily holding them in the hard drive. Thus, system performance is increased. In fact, in some configurations, a system with more RAM will run faster than the same system with a faster processor but with less RAM.

However, when performing a RAID write, the RAID write may not contain a stripe width of full tracks. To perform the write, the parity must first be read, then the new parity generated, and finally the data and new parity can be written. To optimize this process, the parity read can be avoided by writing a stripe width of full tracks. During a write, an assumption that a stripe of full tracks exist must be made and then the tracks are grouped. Nevertheless, during the grouping, the controller may discover that a stripe of full tracks does not exist, yet the write will still include a parity read and the overhead doing the track grouping has been incurred.

It can be seen then that there is a need for a method and apparatus for avoiding unnecessary track grouping during writes.

It can also be seen that there is a need for a method and apparatus to indicate whether or not the track grouping will result in a stripe width of full tracks which can be written in a group to avoid the parity read.

SUMMARY OF THE INVENTION

To overcome the limitations in the prior art described above, and to overcome other limitations that will become apparent upon reading and understanding the present specification, the present invention discloses a method and apparatus for improving write performance in a disk array.

The present invention solves the above-described problems by providing a method and apparatus for avoiding unnecessary track grouping during writes by using a full track write counter. For the purpose of this invention, a write complete using the entire image in cache will herein be referred to as a full track write.

A method in accordance with the principles of the present invention includes receiving a write request, analyzing a full track write counter for tracks in a stripe of tracks associated with the write request, determining whether write request involves a full track write and subsequently executing a cache destage based on the analysis of the full track write counter for tracks in a stripe of tracks associated with the write request.

Other embodiments of a method in accordance with the principles of the invention may include alternative or optional additional aspects. One such aspect of the present invention is that the full track write counter is not incremented when the write to cache is not a full track write.

Another embodiment of the present invention is that a previous track full track count is fetched, a full track count of the tracks associated with the write request are set to be equal to the minimum of either the stripe width or the previous track's full track count plus 1 and the write to the cache is a full track write.

Another embodiment of the present invention is that the step of analyzing a full track write counter further includes receiving a de-stage request for a track and determining whether the full track write counter of the last track in the stripe is equal to a stripe width.

Another embodiment of the present invention is that each track in the stripe is processed for de-stage, new parity for the stripe is generated based on modifications to each track and new data resulting from the modifications and the new parity are written to a rank when the full track write counter of the last track in the stripe is equal to the stripe width.

Another aspect of the present invention is that the generation of new parity comprises exclusively ORing the striped data when the full track write counter of the last track in the stripe is equal to the stripe width.

Another aspect of the present invention is that only the track associated with the de-stage request is processed, an old parity and old data for the track associated with the de-stage request, new parity is generated and new data resulting from a modification to the track and the new parity are written to a rank when the full track write counter of the last track in the stripe is not equal to the stripe width.

Another aspect of the present invention is that the generation of new parity comprises exclusively ORing the old data, the new data and old parity associated with the stripe when the full track write counter of the last track in the stripe is not equal to the stripe width.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 6 illustrates a de-stage with a full stripe, wherein the stripe width is four;

FIG. 7 illustrates a de-stage process with full stripe using full track write counters;

FIG. 8 illustrates the method for maintaining full track write counters; and

FIG. 9 illustrates a method of using full track write counters for write devices.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for avoiding unnecessary track grouping during writes by using a full track write counter. The full track write counter indicates whether or not a track grouping will result in a stripe width of full tracks which can be written in a group. The full track write counter allows the locking of only the de-stage track and the last track in the stripe, which reduces lock contention. In addition, the full track write counter eliminates processing time for grouping tracks to determine whether a full track width exists. Finally, since each track has a control structure associated with it, processor data cache is preserved by not reading the control structure for tracks unnecessarily.

Figure 1:
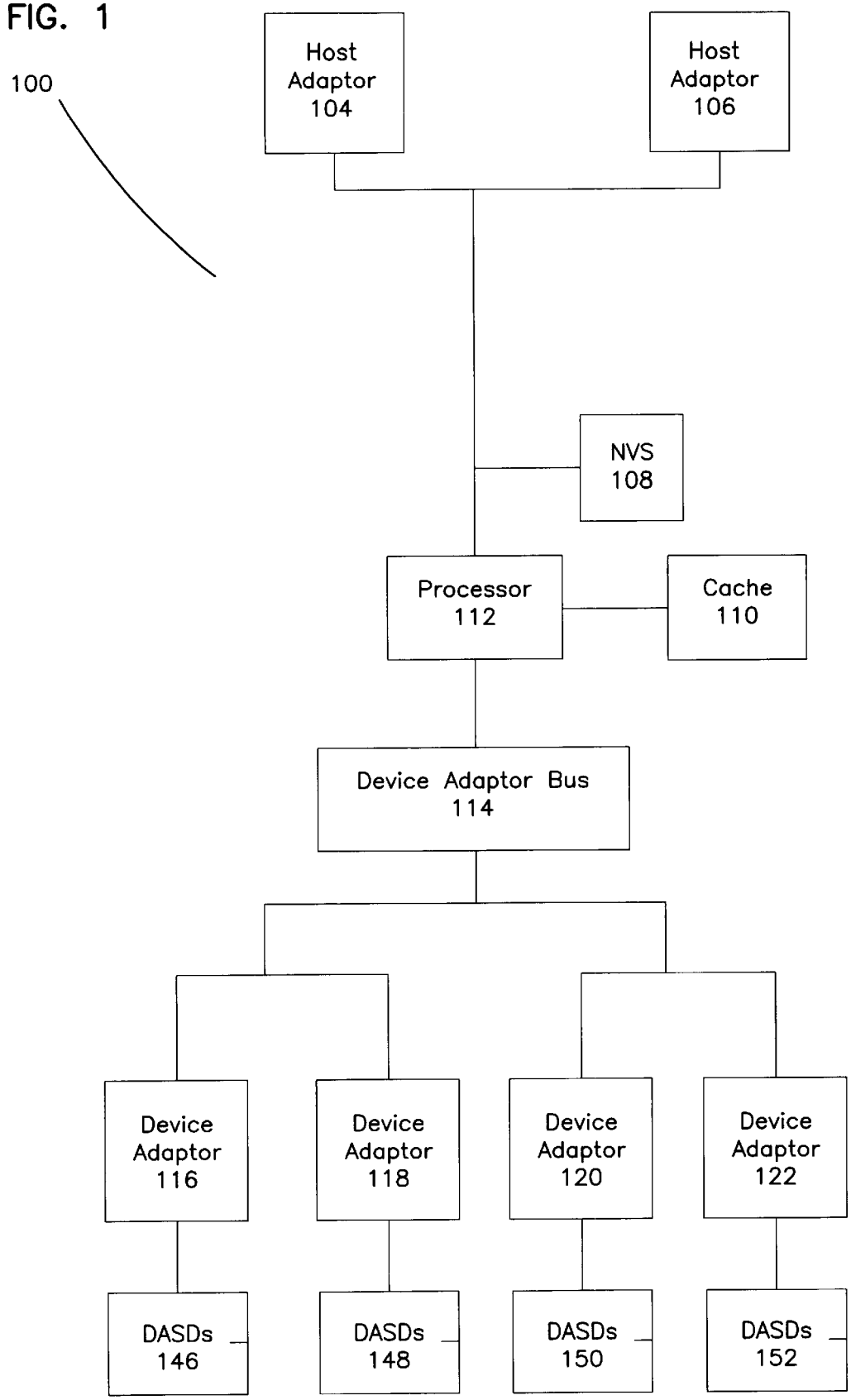
FIG. 1 illustrates a block diagram of a RAID system according to the present invention.

FIG. 1 illustrates a block diagram of a RAID system 100 according to the present invention. In FIG. 1, host adapters 104, 106 provide an interface between host computers or devices (not shown) and DASDs 146, 148, 150, 152, which include multiple RAID arrays. The DASDs are magnetic storage units such as hard disk drives. The host computers and devices are connected to host adapters 104, 106 via a bus interface (not shown), such as a SCSI bus interface. The host adapters 104, 106 may be comprised of an Enterprise System Connection (ESCON) adapter which provides access to ESCON channels and connections. Each host adapter 104, 106 may be comprised of a series of host adapters which connect to a host system.

In addition to host adapters 104, 106, a non-volatile storage unit (NVS) 108, a cache 110, a processor 112, a device adapter bus 114, and device adapters 116, 118, 120, 122 are provided. The host adapters 104, 106 are connected to processor 112. The processor 112 may be a symmetrical multi-processor, such as the IBM RS/6000 processor.

The cache 110 may be external to the processor 112 or included in the processor 112 complex. NVS 108 includes random access electronic storage with a battery backup. Storage time for a fully charged battery may last a couple of days. In preferred embodiments, the NVS battery is continuously charged whenever primary power is applied during normal operations. The battery will supply power necessary to maintain contents of the NVS 108 intact until power is restored. The cache 110, on the other hand, is a volatile storage unit that cannot maintain data in the event of a power failure.

Device adapter bus 114 interconnects the processor 112 with the device adapters 116, 118, 120, 122. The device adapters 116, 118, 120, 122 interface between the storage controller and the DASDs 146, 148, 150, 152, or RAID array of hard disk drives. In preferred embodiments, the device adapters 116, 118, 120, 122 employ the Serial Storage Architecture (SSA) developed by IBM. In such case, the DASDs may be interconnected in a loop topology including multiple RAID arrays.

The processor 112 implements the method for increasing write performance in a disk array by using a full track write counter according to the present invention. The program for implementing the method for increasing write performance in a disk array by using a full track write counter may be included in the processor 112, random access memory (RAM), read-only memory (ROM), and other components.

Figure 2:
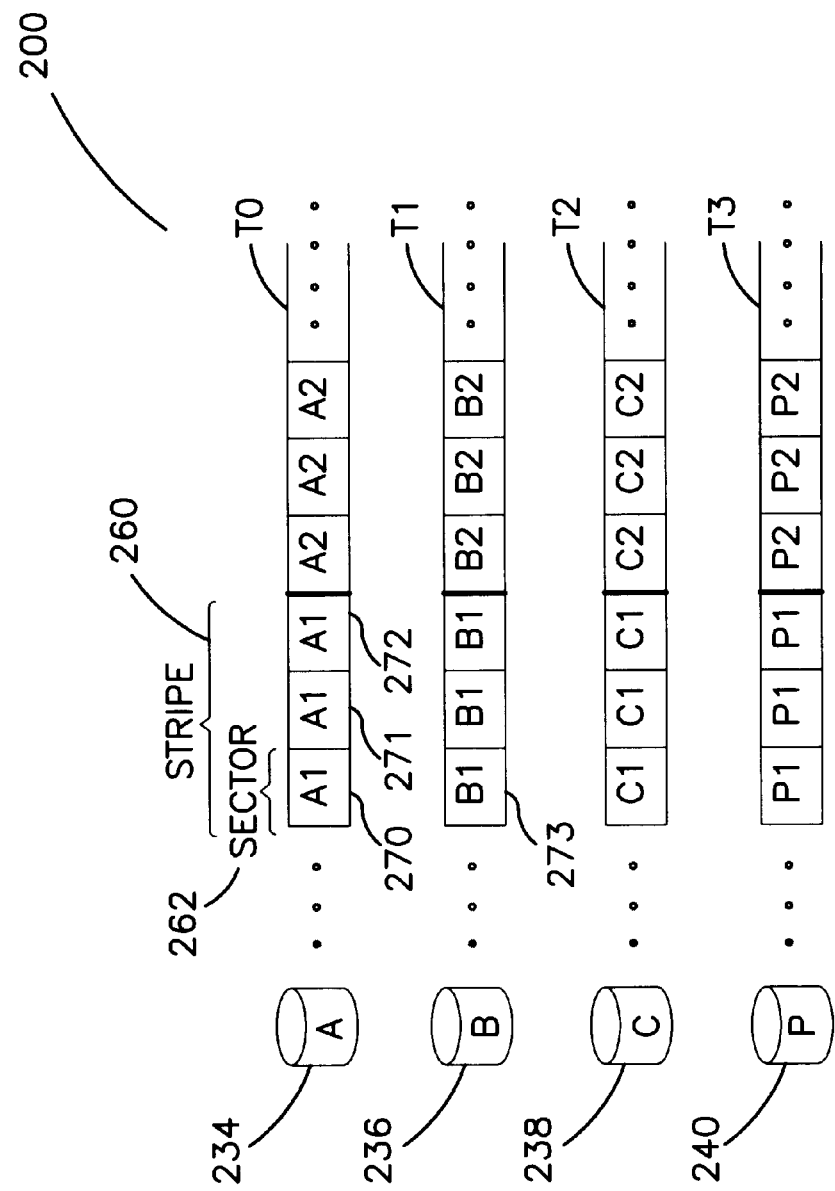
FIG. 2 shows the manner in which data may be stored on the disk storage devices of the array according to RAID 3.

FIG. 2 shows the manner in which data may be stored 200 on the disk storage devices of the array according to RAID 3. In FIG. 2, a stripe 260 is illustrated including tracks A, B. C and P. Each track, as shown in FIG. 2, includes a predetermined number of sectors 262, e.g. three sectors of 512 bytes each. The first track T0 includes sectors A1, A2, and A3. Tracks T1, T2 and T3 are illustrated similarly. When a disk array system receives a request from the host to write new sectors 270, 271, 272 and 273 to the array, generally the rest of the data from the disk in that stripe 260 must be read, a new parity calculation performed, new sector 270, 271, 272 and 273 written, and new parity data written to the storage disk 240. For simplicity, parity blocks are not identified in FIG. 2. Protection of data on disk storage devices 234, 236, 238 is provided by exclusive ORing data records on each device, and storing the parity record resulting from the exclusive ORing on one of the storage devices 240.

Figure 3:
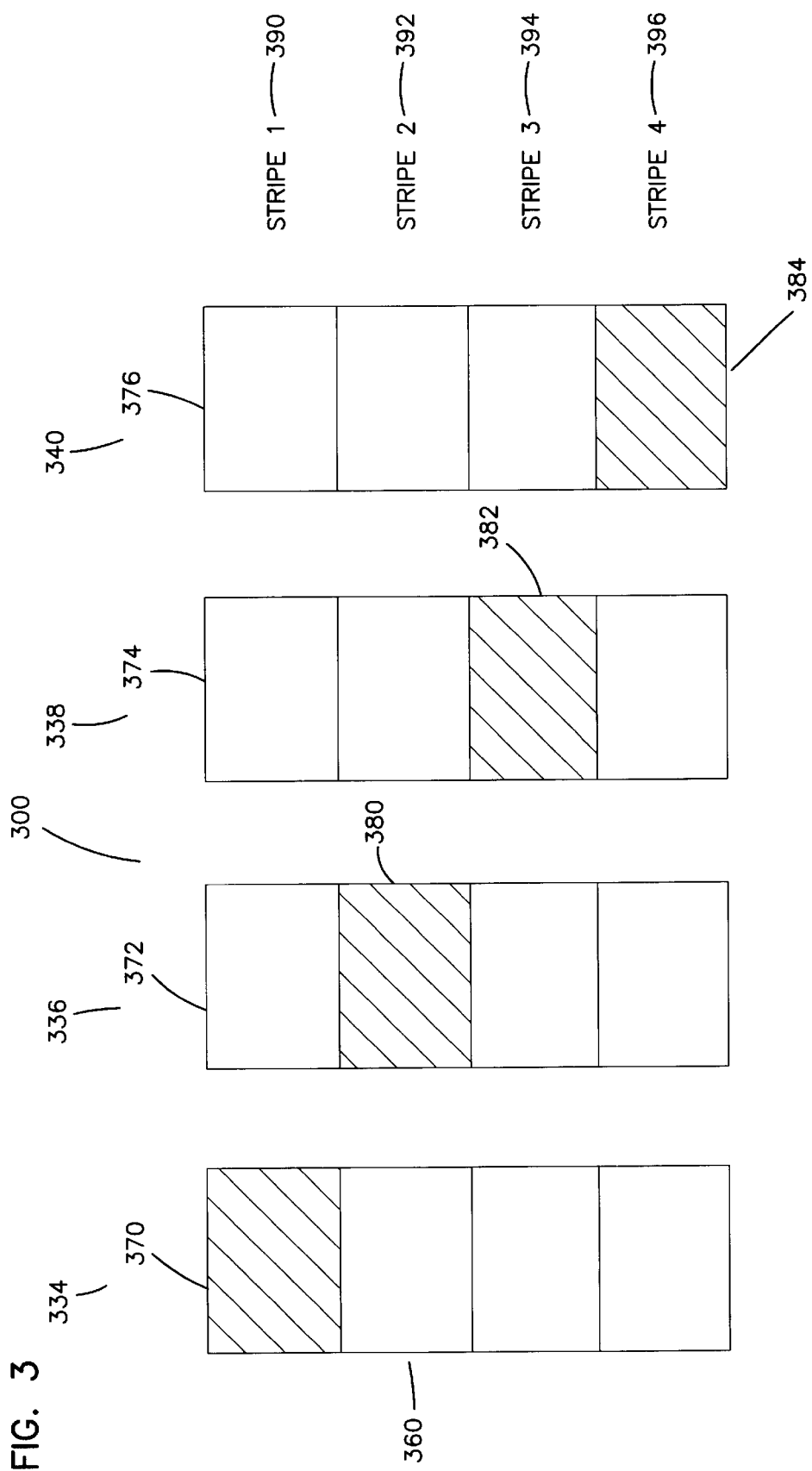
FIG. 3 illustrates the storing of the parity records according to RAID 5.

FIG. 3 illustrates the storing of the parity records according to RAID 5 300. In FIG. 3, each storage device 334, 336, 338, 340 is divided into blocks of data 360 and blocks of parity 370. The blocks represent physical space on the storage devices. Blocks 370, 372, 374, 376, one on each storage device, preferably having the same physical address range, are referred to as stripe 390. There are four stripes shown in FIG. 3. A protected stripe 390 has an associated parity block 370 which contains the exclusive ORing of the other blocks 372, 374, 376 in the stripe 390. That is, the first stripe 390 includes block 370 containing the parity for the remaining blocks, 372, 374, 376. A block 380 on storage device 336 contains the parity for the remaining blocks on the second stripe 392. Block 382, on storage device 338 contains the parity for the third stripe 394. Block 384, on storage device 340 contains the parity for the fourth stripe 396.

Spreading of the parity information according to the above description insures that one particular storage device is not accessed much more than the other storage devices during writing of the parity records following updates to data records on the different stripes. A change to a record stored in a block will result in a change also having to be made to the parity block for the stripe including the changed records. Since the parity blocks of the stripes are spread over more than one storage device, the parity updates will not be concentrated at one device. Thus, I/O activity is spread more evenly over all the storage devices.

However, as discussed above with reference to the prior art, writes which do not contain a stripe width of full tracks must first read the parity and the old data, generate new parity and then write the data and new parity. The parity read can be avoided by writing a stripe width of full tracks. During a write, an assumption is made that a stripe of full tracks exists and a track grouping is initiated. During the grouping, however, it may be discovered that a stripe of full tracks does not exist, yet a write will still include a parity read and the overhead for doing the track grouping has been incurred.

According to the present invention, a necessary track grouping during writes may be avoided by using a full track write counter to indicate whether or not the track grouping will result in a stripe width of full tracks. A full track write counter is maintained for each track in the control unit cache. If a write to cache is a full track write, the full track counter of a sequentially prior track is incremented and stored in the full track write counter of the track being written. When de-staging a track from cache, the ending track of the track stripe is checked for its full track write counter value. If the ending track's full track write counter is equal to the drive stripe width, all tracks in the stripe are de-staged in the same request to increase the RAID write performance. If the ending track's full track write counter is less than a stripe width, no grouping is done, thus saving the overhead of starting to group the tracks but finding there is not a stripe width of full tracks to write.

Figure 4:
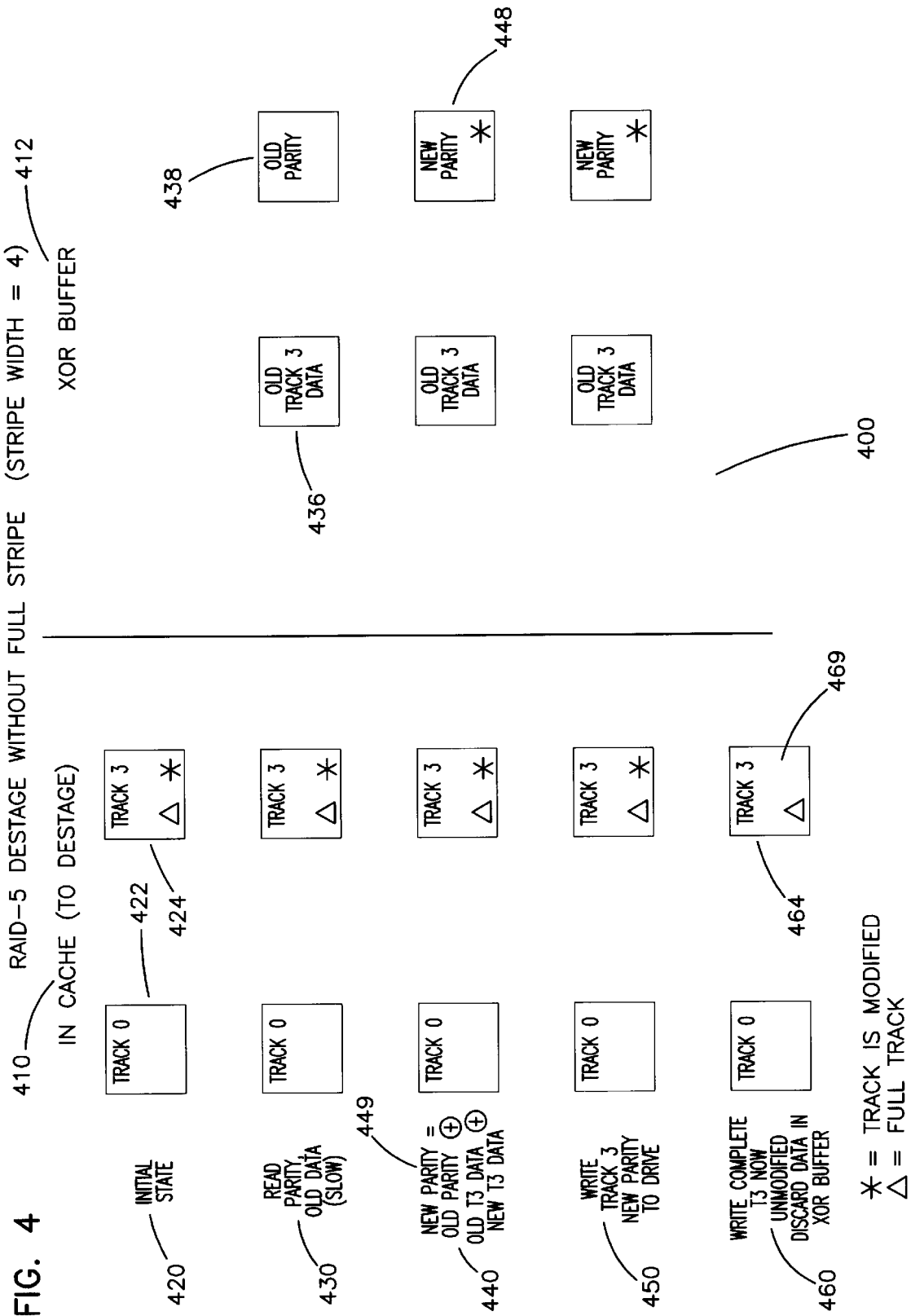
FIG. 4 illustrates a RAID 5 de-stage without a full stripe width of tracks.

FIG. 4 illustrates a RAID 5 de-stage without a full stripe width of tracks 400. The tracks are shown at different steps in the cache 410 for de-staging during the write process. In FIG. 4, a full track write counter is not utilized according to the present invention. The content of a exclusive OR buffer 412 is shown to correspond to the steps in the write process. In step 1 420, the initial state of the cache 410 is shown wherein the cache 410 includes track 0 422 and track 3 424. Track 3 424 is indicated as being a full track that has been modified. In step one 420, the exclusive OR buffer 412 does not contain any information pertaining to track 3 424.

In step two 430, the parity and the initial data in track 3 are read. In step two 430, the exclusive OR buffer 412 contains the old track 3 data 436 and the old parity 438. In step three 440, the new parity 448 is generated in the exclusive OR buffer 412. The new parity is calculated to be equal to the old parity exclusively ordered with the old track 3 data and the new track 3 data 449.

In step four 450, the modified track 3 and the new parity data are de-staged to the drive, i.e., written to the RAID rank. The contents of the cache 410 and the exclusive OR buffer 412 are unchanged. In step five 460, the write is complete. The completed write is represented by track 3 464 being unmodified 469. Also in step five 460, the old track 3 data and new parity in the exclusive OR buffer 412 are discarded.

Figure 5:
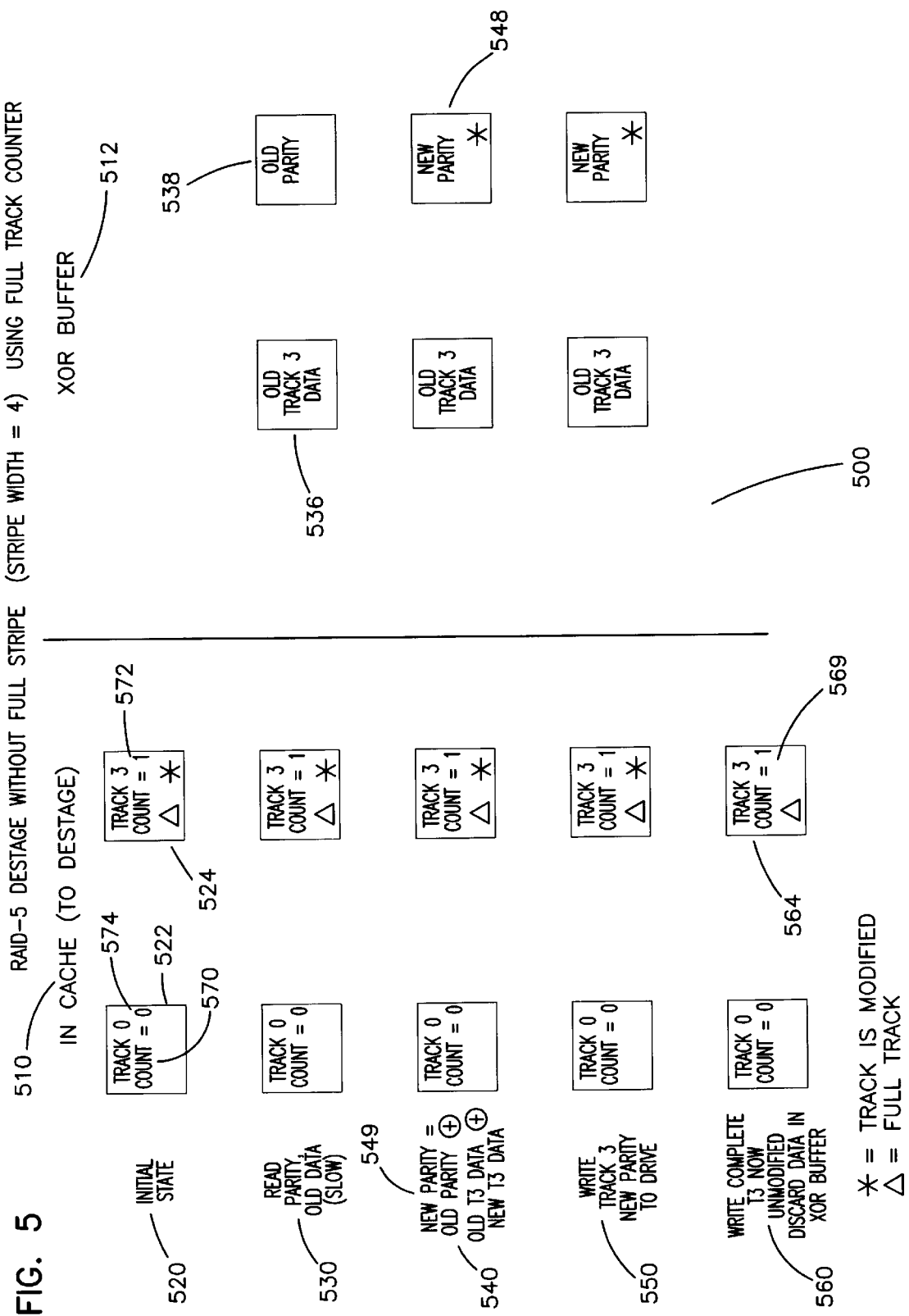
FIG. 5 illustrates a de-staging of a cache without a full stripe using a full track write counter.

FIG. 5 illustrates a de-staging of a cache without a full stripe using a full track write counter 500. The steps illustrated in FIG. 5 are similar to the steps illustrated in FIG. 4, except that a track counter 570 is provided for each of the tracks in FIG. 5. Therefore, some overhead processing is saved by utilizing the full track write counters in each of the tracks. Since the stripe width is four, the track counter for track 3 524 is examined to determine whether it is a full stripe. However, the full track write counter 572 for track 3 524 is set to 1 572. Thus, whether track 0 522 is a full track may be determined by looking at the full track write counter 574 of track 0 522. The full track write counter 574 for track 0 522 is set to 0, therefore track 0 522 is not a full track and track 3 524 must be a full track, but not a full stripe. Thus, track 0 522 is not even examined because there is not a full stripe.

FIG. 6 illustrates a de-stage with a full stripe, wherein the stripe width is four 600. The tracks in FIG. 6 do not include a full track write counter. As with FIGS. 4 and 5, the contents of the cache 610 and the exclusive OR buffer 612 are shown. The initial state of the cache 610 and exclusive OR buffer 612 are illustrated in step one 620. In step one 620, track 0 621 is indicated to be a full track which has been modified. Track 1 622, track 2 623, and track 3 624 are also full tracks which have been modified. In step 1 620, the exclusive OR buffer 612 does not contain any information concerning these tracks. Thus, every track has to be examined to determine if all tracks are full.

In step two 630, the new parity 635 is generated and loaded into the exclusive OR buffer 612. The new parity 635 is equal to the exclusive ORing of the data in tracks 0–3 639. In step three 640, the new parity 645 and revised data in track 0 641, track 1 642, track 2 643, and track 3 644 are de-staged to the drive from the exclusive OR buffer 612. Step four 650 illustrates that the write is complete and that track 0 651, track 1 652, track 2 653, track 3 654 are full tracks which are unmodified 659. The data in the exclusive OR buffer 612 has been discarded.

FIG. 7 illustrates a de-stage process with full stripe using full track write counters 700. The steps illustrated in FIG. 7 are similar to those illustrated in FIG. 6 except each of the tracks includes a full track write counter 770. Since track 0 721 is a full track, the full track write counter 770 for track 0 is set to 1 771. The next track, track 1 722, is also a full track, and therefore the counter is incremented by 1 to result in a count of 2 772. Track 2 723 is also a full track, therefore the full track write counter is incremented to 3 to result in a count of 3 773. Finally, track 3 724 is a full track and its counter is incremented by 1 to result in a count of 4 774. However, rather than assemble track 0 721, track 1 722, track 2 723, and track 3 724 to determine whether a full stripe exists, the controller can look at track 3 724 to determine whether the full track write counter is set to 4 (the stripe width) 774. Since the stripe width is equal to four, if the stripe is a full stripe, the full track write counter will be set to 4 774. Thus, in step 3 740, the controller may write the four tracks 741–744 and the new parity 745 to the drive. The data in the exclusive OR buffer 712 is discarded in step four 750.

FIG. 8 illustrates the method for maintaining full track write counters 800. In FIG. 8, a channel writes track N 810. Then a determination is made whether the track N is a full track write 820. If track N is not a full track write 822, the track N full track write counter is set to 0 830. Then the write request to the cache is completed 840.

However, if track N is a full track write 824, the track N–1 full track count is fetched 850. Then, the track N's full track count is set to be equal to the minimum of either the stripe width or the track N–1 count plus 1 860. Track N's track count is set to be the minimum of the stripe width or the track N–1 count plus 1 because a number of full tracks in excess of the stripe width may be written. By limiting the full track write counter to the stripe width, the number of full tracks can still be maintained. Then the write request to the cache is completed 840.

FIG. 9 illustrates a method of using full track write counters for write devices 900. In FIG. 9, a request for de-staging track N is received 910. Then a determination of whether the last track in the stripe full track count is equal to the stripe width is made 920. If the last track in the full stripe count is equal to the stripe width 922, then each track in the stripe for de-stage is processed 930. Then the drive generates a new parity for the stripe by exclusively ORing the striped data 940. Thereafter, the drive writes the new data and the new parity 950.

If the last track in the full stripe full track count is not equal to the stripe width 924, then only track N is processed for de-stage 960. Then, the drive reads the old parity and track N old data 970. Finally, the drive generates the new parity 980 and then writes the new data and new parity 950.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for increasing write performance in a disk array, comprising:
   receiving a write request;
   maintaining a full track write counter for each track;
   analyzing the full track write counter for a last track in a stripe of tracks associated with the write request;
   determining whether the write request involves a full stripe width of tracks; and
   subsequently executing a cache destage based on the analysis of the full track write counter for the last track in the stripe of tracks associated with the write request.

2. The method of claim 1 wherein the full track write counter is not incremented when the write to cache is not a full track write.

3. The method of claim 1 wherein a previous track full track count is fetched from a previous track's full write counter, a full track count of the tracks associated with the write request are set to be equal to the minimum of either the stripe width or the previous track's full track count plus 1 when the write to the cache is a full track write.

4. The method of claim 1 wherein the analyzing a full track write counter further comprises receiving a destage request for a track and determining whether the full track write counter of the last track in the stripe is equal to a stripe width.

5. The method of claim 4 wherein each track in the stripe is processed for destage, new parity for the stripe is generated based on modifications to each track and new data resulting from the modifications and the new parity are written to a rank when the full track write counter of the last track in the stripe is equal to the stripe width.

6. The method of claim 5 wherein the generation of new parity comprises exclusively ORing the striped data when the full track write counter of the last track in the stripe is equal to the stripe width.

7. The method of claim 4 wherein only the track associated with the destage request is processed, an old parity and old data for the track associated with the destage request, new parity is generated and new data resulting from a modification to the track and the new parity are written to a rank when the full track write counter of the last track in the stripe is not equal to the stripe width.

8. The method of claim 7 wherein the generation of new parity comprises exclusively ORing the old data, the new data and old parity associated with the stripe when the full track write counter of the last track in the stripe is not equal to the stripe width.

9. An apparatus for improving performance in a disk array, wherein the disk array includes parity fault tolerance and a stripe of tracks for storing data, comprising:
   a cache memory for receiving and storing host write data intended for the disk array provided by a host write request;
   a full track write counter associated with each track including a last track in the stripe of tracks, the full track write counter of the last track indicating whether the write request involves a full stripe width of tracks; and
   a controller for analyzing the full track write counter of tracks in the stripe of tracks associated with the write request, determining whether the write request involves a full stripe width of tracks and subsequently executing a cache destage based on the analysis of the full track write counter of the last track in the stripe of tracks associated with the write request.

10. The apparatus of claim 9 wherein the controller does not increment a full track write counter for a track when the write to cache is not a full track write.

11. The apparatus of claim 9 wherein the controller fetches a previous track full track count from a previous track's full write counter, sets a full track count of the tracks associated with the write request equal to the minimum of either the stripe width or the previous track's full track count plus 1 when write to the cache is a full track write.

12. The apparatus of claim 9 wherein the controller analyzes the full track write counter by receiving a destage request for a track and determining whether the full track write counter of the last track in the stripe is equal to a stripe width.

13. The apparatus of claim 12 wherein the controller processes each track in the stripe for destage, generates new parity for the stripe based on modifications to each track and writes new data resulting from the modifications and the new parity to the track when the full track write counter of the last track in the stripe is equal to the stripe width.

14. The apparatus of claim 13 wherein the controller generates new parity by exclusively ORing the striped data when the full track write counter of the last track in the stripe is equal to the stripe width.

15. The apparatus of claim 12 wherein the controller processes only the track associated with the destage request, reads an old parity and old data for the track associated with the destage request, generates new parity and new data resulting from a modification to the track and writes the new parity to the track when the full track write counter of the last track in the stripe is not equal to the stripe width.

16. The apparatus of claim 15 wherein the controller generates new parity by exclusively ORing the old data, the new data and old parity associated with the stripe when the full track write counter of the last track in the stripe is not equal to the stripe width.

17. An apparatus associated with a stripe of tracks, the apparatus comprising:
   a processor; and
   a full track write counter associated with each track including a last track in the stripe, the full track write counter of the last track being used by the processor to indicate whether a write request involves a full stripe width of tracks.

18. The apparatus of claim 17 wherein a full track write counter is not incremented for a track when a write to cache is not a full track write.

19. The apparatus of claim 18 wherein the full track write counter is set equal to the minimum of either a stripe width or a previous track's full track count, from a previous track's full write counter, plus 1 when the write to the cache is a full track write.

20. An article of manufacture for increasing write performance by maintaining a full track write counter, the article of manufacture comprising a computer readable medium having instructions for causing a computer to control the disk caching in a storage system, the method comprising the steps of:
   receiving a write request;
   maintaining a full track write counter for each track;
   analyzing the full track write counter for a last track in a stripe of tracks associated with the write request;
   determining whether the write request involves a full stripe width of tracks; and
   subsequently executing a cache destage based on the analysis of the full track write counter for the last track in a stripe of tracks associated with the write request.

21. The article of manufacture of claim 20 wherein a full track write counter of a track in the stripe of tracks is not incremented when the write to cache is not a full track write.

22. The article of manufacture of claim 20 wherein a previous track full track count is fetched from a previous track's full write counter, a full track count of the tracks associated with the write request are set to be equal to the minimum of either the stripe width or the previous track's full track count plus 1 when the write to the cache is a full track write.

23. The article of manufacture of claim 20 wherein the analyzing a full track write counter further comprises receiving a destage request for a track and determining whether the full track write counter of the last track in the stripe is equal to a stripe width.

24. The article of manufacture of claim 23 wherein each track in the stripe is processed for destage, new parity for the stripe is generated based on modifications to each track and new data resulting from the modifications and the new parity are written to the track when the full track write counter of the last track in the stripe is equal to the stripe width.

25. The article of manufacture of claim 24 wherein the generation of new parity comprises exclusively ORing the striped data when the full track write counter of the last track in the stripe is equal to the stripe width.

26. The article of manufacture of claim 23 wherein only the track associated with the destage request is processed, an old parity and old data for the track associated with the destage request, new parity is generated and new data resulting from a modification to the track and the new parity are written to the track when the full track write counter of the last track in the stripe is not equal to the stripe width.

27. The article of manufacture of claim 26 wherein the generation of new parity comprises exclusively ORing the old data, the new data and old parity associated with the stripe when the full track write counter of the last track in the stripe is not equal to the stripe width.

* * * * *